United States Patent [19]

Seele

[11] Patent Number: 5,000,465

[45] Date of Patent: Mar. 19, 1991

[54] WORK-HOLDING APPARATUS

[76] Inventor: Harold A. Seele, 6636 Sherbourne Dr., Los Angeles, Calif. 90056

[21] Appl. No.: 529,861

[22] Filed: May 29, 1990

[51] Int. Cl.⁵ .......................... B23B 31/10; B25B 1/04
[52] U.S. Cl. ................................... 279/1 L; 269/130; 279/33; 279/106; 279/114
[58] Field of Search ........................ 269/108, 130–132; 279/16, 17, 33, 35, 106, 110, 114, 1 L

[56] References Cited

U.S. PATENT DOCUMENTS

| | | | |
|---|---|---|---|
| 4,778,252 | 10/1988 | Filho | 279/1 L X |
| 4,819,527 | 4/1989 | Redman | 279/1 L X |
| 4,872,655 | 10/1989 | Seele | 269/130 |

Primary Examiner—Steven C. Bishop

[57] ABSTRACT

Apparatus is disclosed for holding a generally cylindrical workpiece for honing or otherwise machining an internal bore. The workpiece is held by a gripping surface over most of the innermost turn of a spirally wound torsion band coil. The workpiece is grasped circumferentially over its outer surface without excess contact pressure at any particular point. A tendency of the machining operation to rotate the workpiece serves to secure the workpiece more tightly in position by tightening the outer turns of the tension band coil. A rotatable tensioning member acts under the influence of a biasing spring to decrease the diameter of the innermost turn of the tension band coil to bring the gripping surface into contact with the workpiece. The outer diameter of the tension band coil is variable under the influence of a plurality of segmented support members which are adjustable radially inward and outward to extend the range of utility of the tension band coil. This radial adjustment is accomplished through the action of an associated cam plate which engages the support segments to control their radial movement and positioning in unison. An alternative arrangement uses a plurality of torque bands, instead of the single torsion band coil, which overlap about the workpiece opening to achieve the desired gripping effect. The degree of overlap, and thus the size of the opening, is controlled by an associated cam disk.

39 Claims, 4 Drawing Sheets

5,000,465

WORK-HOLDING APPARATUS

BACKGROUND OF THE INVENTION

1. Field of the Invention.

This invention principally relates to work-holding apparatus and, more particularly, to apparatus for holding a workpiece having an internal bore so that the surface of the bore can be honed or otherwise machined.

2. Description of the Related Art.

Conventional lathe chucks are not well adapted for holding a thin-walled object such as a cylindrical shell having an internal bore which requires honing, polishing, or various types of machining. The jaws of a conventional lathe chuck apply force to just a few points of the workpiece, thus tending to deform the shell. Sometimes such workpieces are held by hand or with a hand tool in order to perform honing operations on the interior surface of a bore in the workpiece. The lack of stability and the development of operator fatigue in such an approach are obvious, and the chance of marring the surface being worked on or of otherwise producing an unsatisfactory result clearly exists. In addition, holding a workpiece by hand against rotating machinery is an inherently risky procedure from the standpoint of operator safety.

It would be a great boon in machine shop practice if there existed a means for holding a workpiece for honing or otherwise machining the inside of a bore in the object without damaging the outer surface of the object, while providing sufficient holding strength and stability. Such a work-holding apparatus would be even more valuable if it were convenient to use, easy to install in a working position, economical to manufacture, and simple to service. It would also be advantageous if such a work-holding means had the capability of gripping a deformable object over its entire outer circumference without distorting its shape because of contact forces concentrated at just a few points.

Examples of improved devices which may be used for holding a workpiece and which are particularly adapted for holding a thin-walled, hollow, deformable workpiece without scratching or distorting its shape may be found in my prior U.S. Pat. Nos. 4,872,654 and 4,872,655. My present invention follows the same principle of establishing and maintaining a grip on the outer surface of a cylindrical workpiece but provides a more sophisticated and effective mechanism for applying the principle. In particular, the embodiments of the present invention achieve a greater degree of adjustability to the size of the workpiece in a given implement than is possible with respect to the devices of my prior patents.

SUMMARY OF THE INVENTION

The present invention incorporates all of the hoped-for advantages listed above in apparatus for holding a generally cylindrical workpiece for honing or otherwise machining an internal bore. The workpiece is held by the innermost turn of a spirally wound, flat spring, torsion band coil. The innermost turn has a gripping surface which grasps the workpiece circumferentially over its outer surface without excess contact pressure at any particular point. The tendency of the machining operation to rotate the workpiece serves to secure the workpiece more tightly in position.

One particular arrangement in accordance with the present invention incorporates an adjustable grip assembly which is adapted for installation within a control assembly. The grip assembly holds and supports the coiled torsion band in operative position. The control assembly provides for variable adjustment of the grip assembly and is capable of accepting different grip assemblies to accommodate different ranges of workpiece size.

A plurality of grip assemblies may be provided to accommodate different range of workpiece size. The grip assembly corresponding to the size of the workpiece to be worked on is selected and installed in the control assembly for a given operation. The control assembly is mounted in a housing which is adapted for installation in a work machine fixture wherein the work-holding apparatus of my invention is to be employed. In one embodiment, the housing supports a pulley and cable mechanism, which may be pneumatically or hydraulically actuated, for causing the control assembly to close or open the torsion band in gripping or releasing the workpiece. The control assembly provides interaction with indexing and referencing guides in the housing to permit various adjustments in setting up the mechanism in preparation for engaging the workpiece.

The control assembly principally comprises a tension control ring and an actuator ring which are concentrically mounted for relative rotation with respect to one another. Each of the two rings includes a shell portion which between them define an annular space in which a band spring is positioned. This spring is in the form of a band which is wound in several concentric turns and anchored at its outer end to the shell of the tension control ring and at its inner end to the shell of the actuator ring; it functions somewhat like the mainspring of a clock or watch to provide a rotational biasing force between the two rings. A pivotably mounted link extends from a pivot point on the actuator ring to engage an activator pin, affixed to the inner end of the coiled torsion band, whenever one of the grip assemblies is installed in the control assembly. This enables the rotational position of the control ring to open and close the torsion band to engage the peripheral surface of a workpiece.

Increased range of movement for the torsion band of a given grip assembly in order to accommodate a greater range of workpiece dimensions is afforded by the provision of radially slidable L-shaped support segments mounted to support the torsion band; one of which constitutes an anchor segment for the outer end of the torsion band. Radial adjustment of these support segments is effected by means of arcuate slots in a rotatable cam disk which guide a plurality of pins on the respective individual support segments, thereby moving them in unison radially inward or outward as desired to cause the torsion band to adjust to a given size of workpiece within the range for a particular grip assembly. As noted, the grip assemblies are interchangeable with respect to the control assembly.

A hand grip is provided on the actuator ring to permit an operator to release and engage the workpiece by opening and tightening the torsion band. Provision is also made for accomplishing this by using a foot operated valve in an air line providing pressurized air to a piston/cylinder unit which is coupled to the actuator ring by a cable extending over a pulley mounted on the piston. The entire unit is simple and effective in use, requiring a minimum of operator time to set up for a given machining operation.

In an alternative arrangement in accordance with the present invention, the single torsion band for holding a workpiece is replaced by a plurality (in one embodiment, eight) of separate torque bands which are positioned to overlap about the workpiece. Each of these torque bands has a terminal end which is coated with an abrasive layer along its inner surface and is secured at its other end to a hinged actuator plate which is pivotably supported by a circumferential retainer band. The retainer band is formed with a plurality of gudgeons, or journals (equal in number to the number of tension bands), equally spaced along its length. Each actuator plate has a pivot portion which is placed in a corresponding one of the retainer band journals prior to mounting the band in a circumferential position inside the annular shell of the mounting frame. Once installed, the actuator plates and their associated torque bands are equally spaced about the inner periphery of the annular frame.

Each of the actuator plates also has a cam follower pin extending laterally for engagement with a rotatable disk-shaped cam plate. The cam plate has a plurality of angled slots, equal in number to the actuator plates, which extend between inner and outer radial points around the cam plate. Each cam follower pin is mounted in a corresponding cam plate slot such that, as the cam plate is rotated in a first direction, the actuator plates are moved from a small angle relative to the diameter of the circular frame (in which the opening formed by the overlapped torque bands is a minimum) to a position forming a larger angle with the diameter (wherein the opening formed by the overlapped torque bands is a maximum). The cam plate is provided with a projecting arm which is spring biased to urge the overlapped torque bands toward the minimum size opening.

In use, the operator moves this arm against the spring biasing force, thereby causing the overlapped torque bands to increase the size of the central opening in order to permit a workpiece to be inserted. Thereafter, releasing the arm allows the spring to return the cam plate toward the position of minimum size opening, during which the torque bands engage the surface of the workpiece, thereafter holding the workpiece against rotation.

Benefits of this alternative arrangement in accordance with the present invention are a reduction in the number of parts required for the workholder and the increased range of workpiece size which can be accommodated by a single assembly. This unit can also be provided in different size ranges and made interchangeable to accommodate a greater variation in workpiece size.

BRIEF DESCRIPTION OF THE DRAWINGS

A better understanding of the present invention may be realized from a consideration of the following detailed description, taken in conjunction with the accompanying drawing in which:

FIG. 5 is a schematic perspective view of the torsion band used in the arrangement of FIG. 1;

FIGS. 6-8 are, respectively, front, plan and rear views, partially broken away, of the grip assembly which is part of the arrangement of FIG. 1, FIG. 8 being a view taken along the line 7—7 of FIG. 7, looking upward in the direction of the arrows 8;

FIG. 6A is a view of an element of the grip assembly of FIGS. 6-8;

DESCRIPTION OF THE PREFERRED EMBODIMENTS

Figure 1:
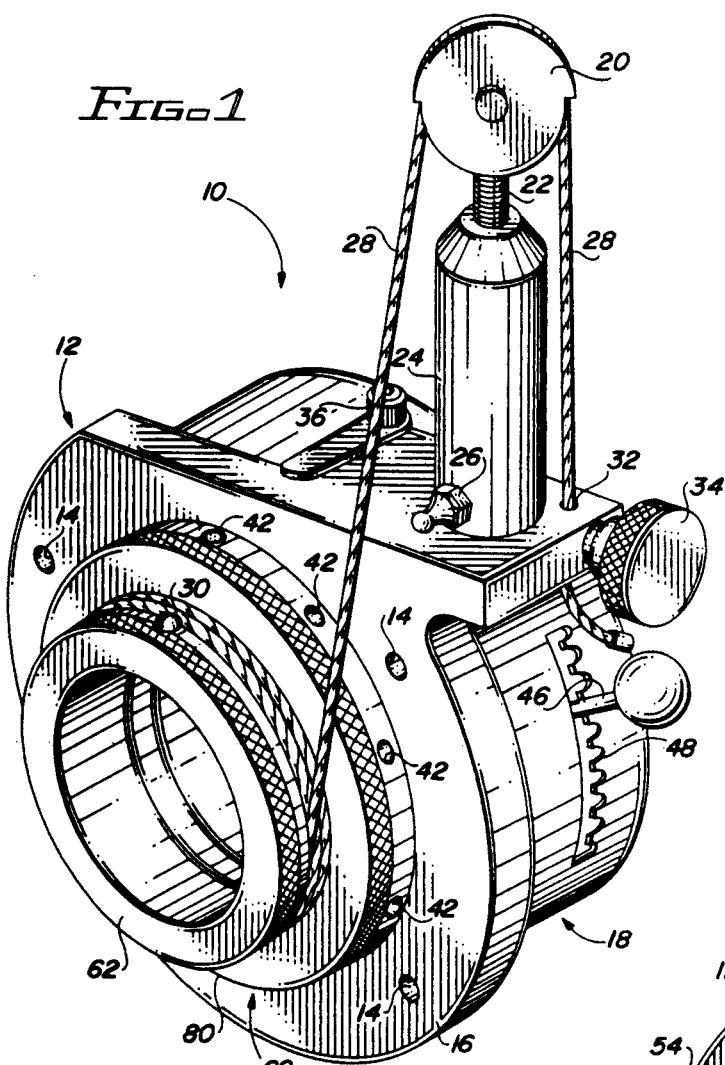
FIG. 1 is a schematic perspective view of one particular arrangement in accordance with the invention.

One particular arrangement in accordance with the present invention is in the form of a workholder 10 shown in FIGS. 1-4. The implement 10 comprises a housing 12 having a plurality of mounting holes 14 spaced about a mounting flange 16. Behind the mounting flange 16 is a generally cylindrical housing portion 18 into which the major operating portions of the workholder 10—a grip assembly 40, shown in FIG. 4, and a control assembly 60—are installed by inserting through the larger opening in the housing portion 18 from the rear side thereof.

Figure 2:
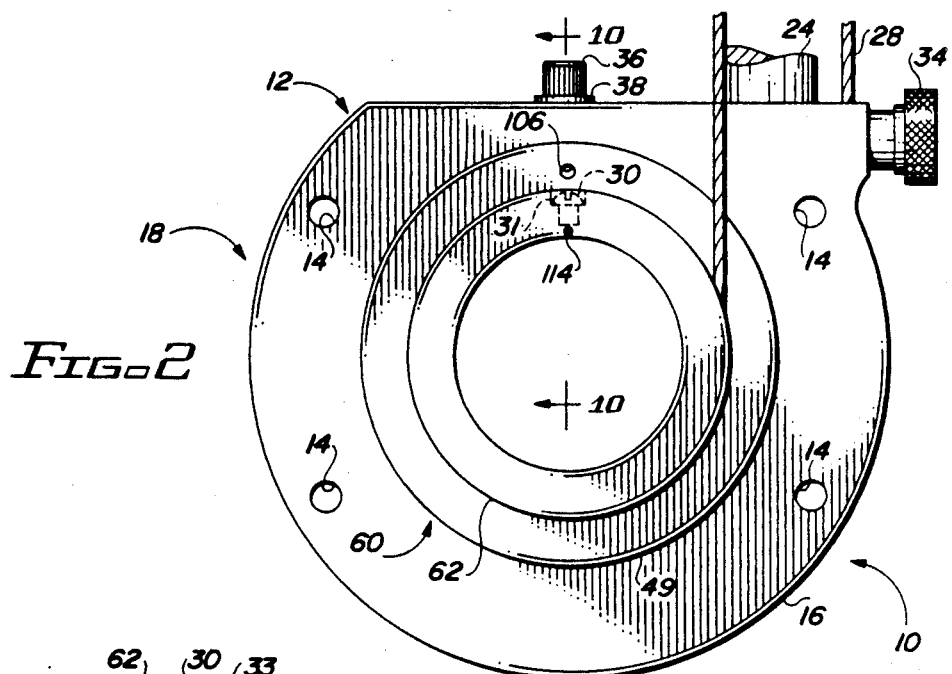
FIGS. 2-4 are, respectively, front, plan and rear views taken from the arrangement of FIG. 1 with the upper extension member broken away.

The housing 12 supports a pulley 20 mounted on a rod 22 extending from a piston/cylinder mechanism 24 which is air-actuated via an air inlet 26 to which a pneumatic tube may be connected. A cable 28 extends from an anchor point on the housing 12 over the pulley 20 to an inner ring 62 of the control assembly 60. The cable 28 is wrapped a few times around the circumference of the ring 62 and anchored by anchor screw 30. As shown in FIG. 2, the cable set screw 30 is positioned in a recess 31 in the ring 62. At the housing anchor point, the cable 28 extends through a hole 32 in the housing 12 and is held in position, after its operative length is adjusted, by means of a thumb screw 34. Another screw 36 is threaded into the cylindrical housing portion 18, holding a flat spring 38 which controls a ball detent mechanism for the control assembly 60.

Figure 3:
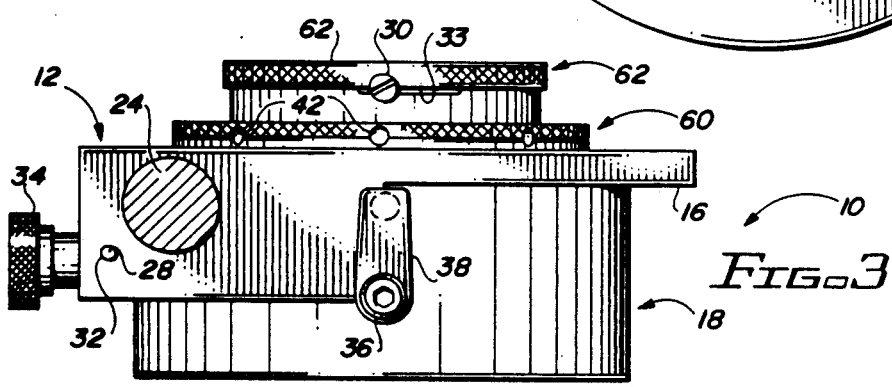
Figure 4:
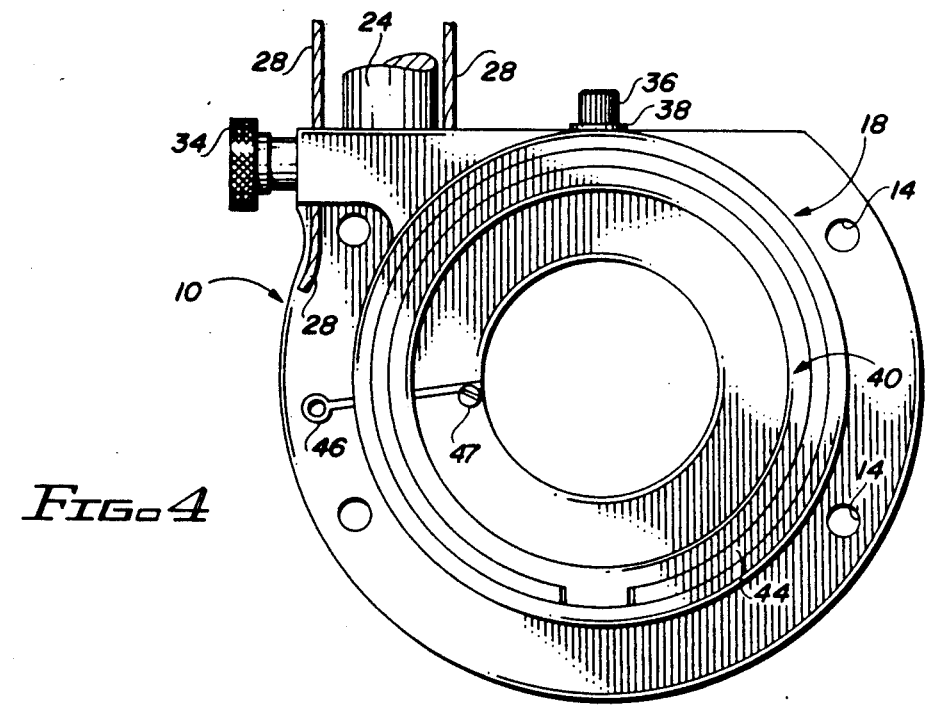

FIG. 3 shows a slot 33 in the periphery of the ring 62 into which one end of the cable 28 is inserted for anchoring by the screw 30. About the circumference of the control assembly outer ring 80 are a plurality of spanner holes 42 into which a spanner pin or wrench may be inserted for rotatably adjusting the angular position of the control assembly 60 within the housing 12. A circular spring clip 44 (FIG. 4) retains the control assembly within the housing 12. A spring lever 46, retained by a screw 47, is adjustable to different index points along a serrated index slot 48 to provide a fine adjustment of the grip assembly with its torsion band in the relaxed position, details of which will be described hereinbelow.

FIG. 5 shows the torsion band 70, which is a flat band of spring steel coiled in a spiral like a clock spring. The inner surface 73 of the inner turn 72 is roughened to provide a gripping surface for the workpiece. This roughened surface may be achieved by using the process by which sandpaper or abrasive cloth is made. An alternative is to plate a thin layer of metal over diamond dust along the surface of the innermost turn. An activator pin 74 is fastened, as by welding, to the free end of the innermost turn 72. The other end 77 of the band 70 is shaped to form an anchor 76 for securing the end 77 in the grip assembly 40.

The grip assembly 40 is shown in the views of FIGS. 6 and 7. It principally comprises a cam disk 50 and a segment carrier disk 52. In the depicted embodiment, the carrier disk 52 is formed with six T-shaped recesses, equally spaced at 60 degree intervals, in the face of the disk which is remote from the cam disk 50. There are six support segments 54 which serve the function of supporting the band 70 and adjusting the size of the band 70 according to the setting of the control assembly 60. As will be understood from the perspective view of FIG. 6A, each support segment 54 is generally L-shaped in profile (see FIG. 7) and has a pie-shaped portion 55 and an arcuate portion 56. Each pie-shaped portion 55 is formed with a hole 57 in which a cam follower pin 58 is mounted. The support segment 54A has a slot 59 in its arcuate portion 56 which forms an anchoring element 78 on which the anchor 76 at the outer end 77 of the band 70 is installed.

At the back of each pie-shaped portion 55 is a radially oriented, T-shaped protrusion 66 shaped to match the T-shaped recess 64 in the segment carrier disk 52. Thus, each of the support segments 54 can move radially inward and outward along the T-shaped recess 64. At the base of the recess 64 is an elongated radial slot 68 through which the pin 58 extends to engage a corresponding cam slot 69 in the cam disk 50. The cam disk 50 is arranged to rotate relative to the segment carrier disk 52 about their common axis and in so doing guides the cam follower pins 58 radially inward or outward along their respective cam slots 69, thus directing the support segments 54 in which the pins 58 are mounted to move radially inward or outward. As the support segments 54 move in unison upon rotation of the cam disk 50, the band 70 is caused to reduce or enlarge its diameter, thereby enabling it to engage or release a workpiece. FIG. 6 shows the support segments 54 in their radially outermost positions with the pins 58 (see pin 58C) at the outer ends of the slots 68.

FIG. 8 is a view from the underside of FIG. 7 with the cam disk 50 removed, showing the support segments 54 moved about halfway in from their radially outermost positions (illustrated in FIG. 6). The segment carrier disk 52 is partially broken away to show the full view of the underside of support segment 54F.

Figure 9:
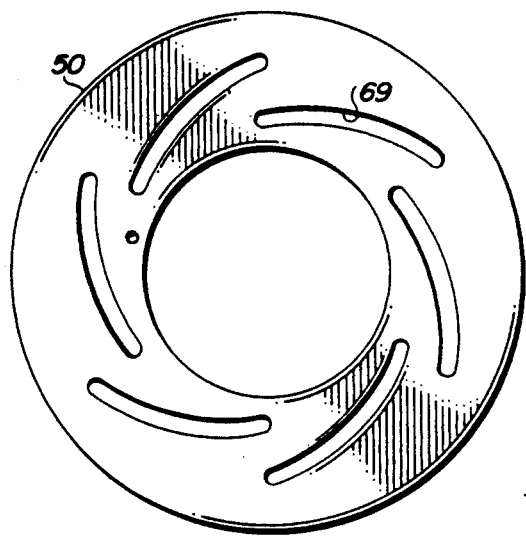
FIG. 9 is a view of the cam disk in the arrangement of FIG. 7, taken along the line 7—7 looking downward in the direction of the arrows 9.

FIG. 9 shows the face of the cam disk 50 which is adjacent the face of the segment carrier disk 52 that is visible in FIG. 8. Each pin 58 rides in a corresponding cam slot 69 in cam disk 50 as the cam disk 50 is rotated clockwise or counterclockwise relative to the segment carrier disk 52, thereby driving the pins 58 and their attached support segments 54 in and out between the limits of the slots 68 at the bottoms of the T-shaped recesses 64. As the support segments 54 move radially inward and outward, the diameter of the associated torsion band 70 is adjusted accordingly.

Figure 10:
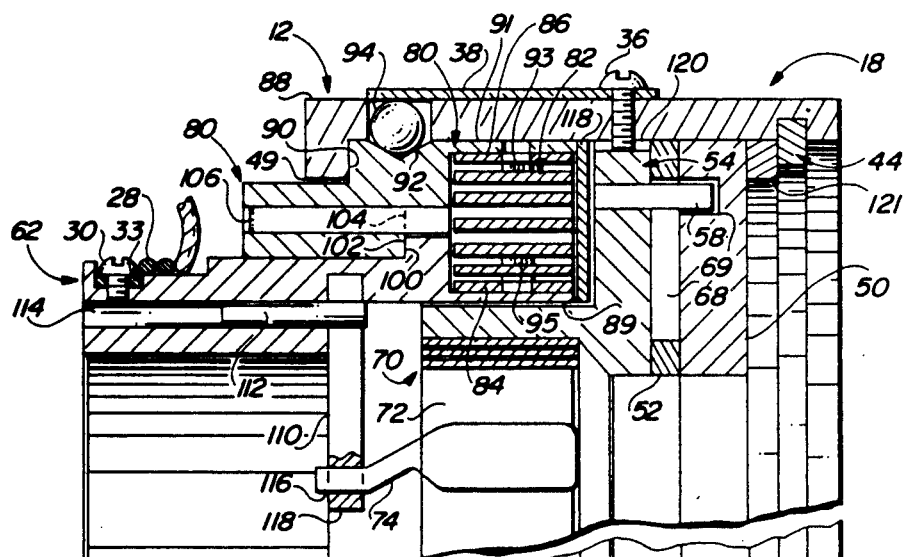
FIG. 10 is a sectional view in schematic form, partially broken away, of a portion of the arrangement of FIG. 1, taken along the line 10—10 of FIG. 2.

Particular details of the control assembly 60 and the grip assembly 40 are shown in the sectional view of FIG. 10 which represents these assemblies installed within the housing 12, 18. Cable 28 is shown wrapped with three or four turns about the actuator ring 62, the cable end being inserted in the slot 33 and clamped by the screw 30.

The principal components of the control assembly 60 are the (inner) actuator ring 62, the (outer) tension control ring 80, and a spiral spring 82 that extends between them and has opposite ends 84, 86 respectively anchored to the actuator ring 62 and the tension control ring 80. The tension control ring 80 has a shoulder portion 88 which bears against a flange portion 90 of the housing 12 defining the bore 49.

Together the right-hand ends of the actuator ring 62 and tension control ring 80 comprise thin annular shell portions 89, 91, respectively, which define between them a chamber for the tension spring 82. The opposite ends 84, 86 of the tension spring 82 are anchored to these shell portions at points 95, 93, respectively. The tension control ring 80 has a plurality of angled recesses 92 which are regularly spaced about the periphery (every 10 degrees in one embodiment). These operate with the ball 94 and flat spring 38 to provide an indexing guide so that the angular position of the tension control ring 80 relative to the housing 12 may be easily adjusted by regular (10 degree) intervals, using a spanner pin in the holes 42 (FIG.1).

Mating surfaces 100, 102 of the actuator ring 62 and tension control ring 80 serve to retain the actuator ring 62 within the control assembly 60 while permitting the two rings to rotate relative to each other. The annular surface 100 of the actuator ring 62 has an outwardly projecting ear 104, indicated in phantom outline, at one point in its circumference. A pin 106 is mounted in the tension control ring 80 so as to project into the position adjacent the annular surface 100, thereby limiting the circumferential travel of the tension control ring 80 to slightly less than 360 degrees.

An actuator link 110 is mounted on a pivot pin 112 which is inserted in opening 114 in the actuator ring 62. When the grip assembly is installed in the housing 12 (after the control assembly 60 has been placed in position) the actuator pin 74 of the torsion band 70 is inserted into a hole 116 in the free end 118 of the actuator link 110. This serves to open and close the innermost turn 72 of the torsion band 70 as the actuator ring 62 is rotated relative to the tension control ring 80 in response to take-up of the cable 28 or hand manipulation by the operator, as the ring 80 is held by the detent mechanism 92, 94.

The segment carrier disk 52 has a detent recess 120 at a point on its outer periphery. This is provided so that the grip assembly 40 can be locked in position by the set screw 36. A thin annular disk 118 serves as a closure for the chamber in which the tension spring 82 is contained. A bearing ring 121 is installed next to the retainer ring 44 to maintain the location of the internal parts of the overall assembly and to permit rotation of the cam disk 50.

In operation of the workpiece holder 10, as shown and described, a particular grip assembly 40 is selected having a range of torsion band size adjustment which will accommodate the particular workpiece with which the workholder is to be used. The selected grip assembly 40 is slipped into the housing 12 in which the control assembly 60 has already been installed, taking care to insert the actuator pin 74 of the torsion band 70 into the hole 116 in the end 118 of the actuator link 110.

After rotating the tension control ring 80 and the grip assembly 40 to the desired positions such that the recess 120 of the segment carrier disk 52 is underneath the screw 36, the screw 36 is tightened so as to lock the segment carrier disk 52 in position while retaining the detent ball 94 in the selected detent recess 92 of the tension control ring 80. The spring lever 46 (FIG. 1) is then adjusted within the slot 48 to a position where the torsion band 70 is just slightly larger than the workpiece. Angular movement of the lever 46 rotates the cam disk 50, thereby causing the support segments 54 to adjust the opening of the torsion band 70. The actuator ring 62 is then rotated against the spring tension of the tension spring 82 until the torsion band opening is sufficient to receive the workpiece. The effective cable length is adjusted by taking up slack at the anchor point under thumb screw 34. With the workpiece in place within the torsion band 70 in the workholder 10, the actuator ring 62 is released, either by letting go from the operator's hand or by releasing the compressed air in the cylinder 24. The tension spring 82 then rotates the actuator ring 62 until the inner turn 72 of the torsion band 70 comes into contact with the circumferential surface of the workpiece. Rotation of the workpiece then drives the rotation of the actuator ring 62 further, thereby firmly locking the torsion band 70 on the workpiece, holding it against further rotation.

Figure 11:
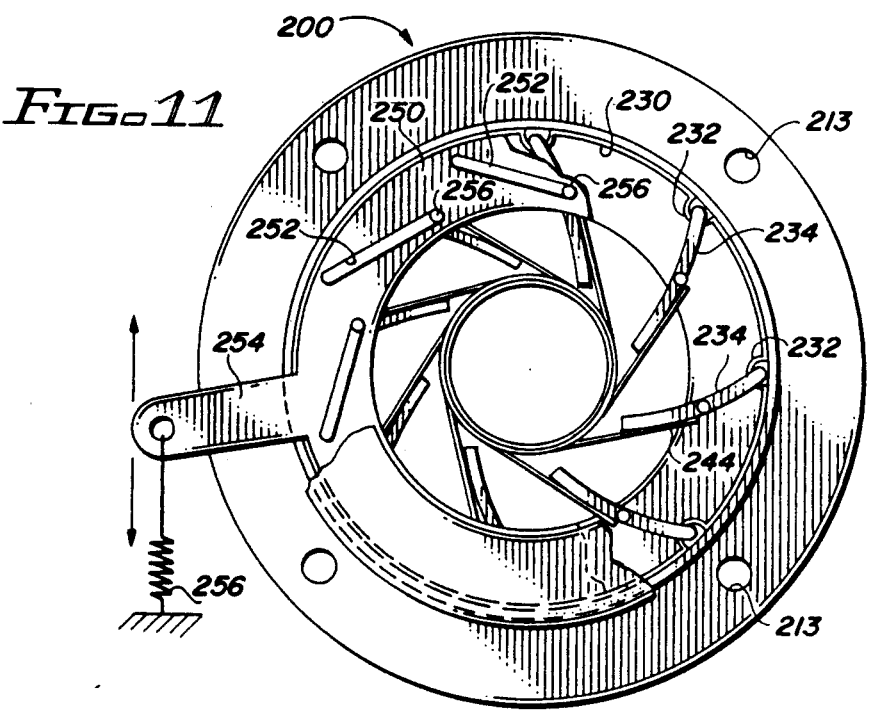
FIGS. 11 and 12 are end and side views, respectively, partially broken away, of an alternative arrangement in accordance with the invention.
Figure 12:
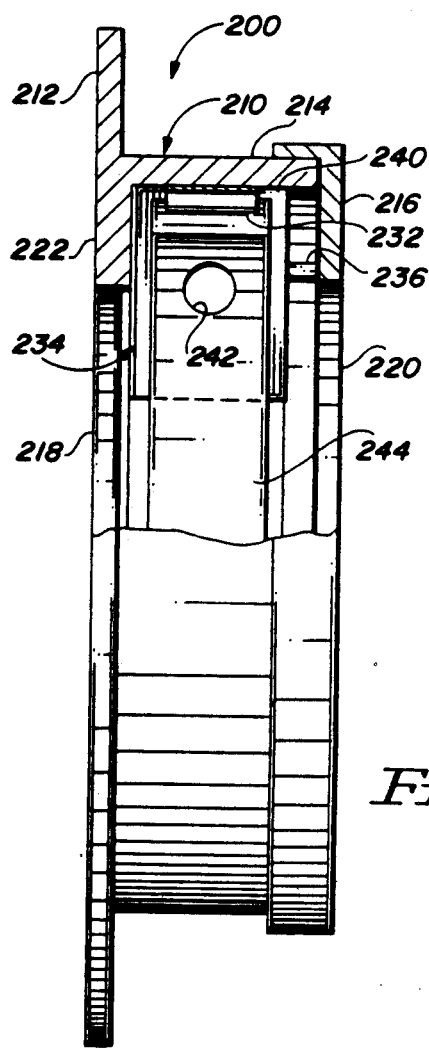
Figure 13:
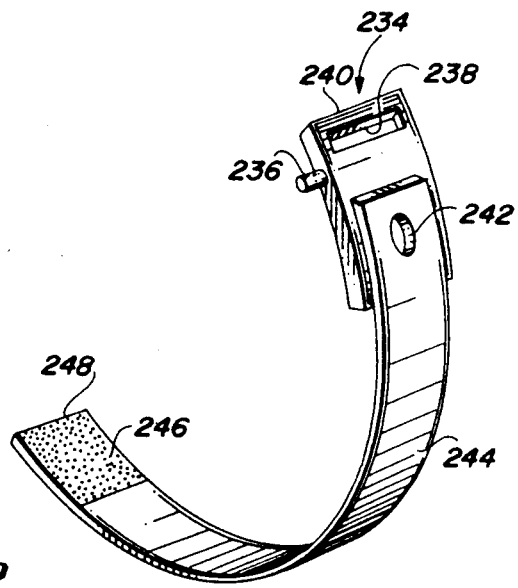
FIG. 13 is a view of a torque element which is used in the arrangement of FIGS. 11 and 12.

FIGS. 11-13 illustrate a second preferred embodiment in accordance with the present invention. Referring particularly to FIGS. 11 and 12, this embodiment of the workholder 200 is shown comprising a housing 210 having an outer mounting flange 212 with mounting holes 213, an inner flange 222 and an annular shell 214. A disk-shaped cover 216 is installed across the opening in the side of the housing remote from the flange 212. The housing 210 has a central opening 218 of substantially the same size as a corresponding opening 220 in the cove 216.

A circumferential retainer band 230 is mounted just inside and against the inner wall of the shell 214. This is formed at regularly spaced intervals, corresponding to the number of the actuator elements in the assembly, with a plurality of pivot sleeves or gudgeons 232. A plurality of actuator plates 234 (in this case eight) is shown installed in the gudgeons 232. Each actuator plate 234 (see FIG. 13) has a cam follower pin 236 along one edge and an opening 238 in one end which defines a pivot member 240. Attached to the actuator plate 234 by means of a rivet 242 is a torque band 244. Each torque band 244 has a roughened inner surface 246 near its free end 248.

A cam plate 250 has a plurality of cam slots 252 for receiving the cam follower pins 236 of the actuator plates 234. An arm 254 of the cam plate 250 is biased by a spring 256 to rotate the cam plate toward the open position of the overlapped torque bands 244.

In assembling the device 200, the circumferential retainer band, in strip form, is threaded through the openings 238 in the actuator plates 234 until each pivot member 240 is located in a corresponding gudgeon 232. The retainer band 230 is then formed in a circle and inserted into the shell 214 in the manner indicated in FIG. 11, wherein eight actuator plates 234 are shown equally dispersed about the interior of the shell 214. The cam plate 250 is then placed in position with one of the cam follower pins 236 in each of the cam slots 252, after which the cover 216 is installed. The cover 216 has an opening along one sector which is sufficient to permit the necessary movement of the arm 254 of the cam plate 250.

With the workholder as shown in FIG. 11 (cam plate 250 rotated counterclockwise so that cam follower pins 236 are all at the radially innermost positions within the slots 252), the central opening formed by the overlapping of the torque bands 244 assumes a minimum diameter. In use, this this would be slightly smaller than the outer diameter of the workpiece for which this workholder 200 is selected. To insert a workpiece, the arm 254 is raised to rotate the cam plate 250 clockwise, thereby moving cam following pins outward and opening up the central opening in the overlapped torque bands 244. With the workpiece in position within the central opening, the arm 254 is released and the spring 256 tends to rotate the cam plate 250 counterclockwise so that the inner ends of the actuator plates 234 and the attached torque bands 244 move inwardly. The roughened inner surfaces 246 of the overlapping inner ends 248 of the torque bands 244 firmly grip the workpiece, thereby holding it against rotation.

The embodiment of the workholder 200 produces essentially the same result as the embodiment 10 shown in FIGS. 1-10. However, it is constructed with fewer parts, is of simpler construction, and provides a greater range of opening size for a given assembly.

In both of the embodiments of the invention disclosed herein, an extremely effective workpiece holder is provided. The central opening is readily adjustable in the range of sizes for which a given implement is designed, so that the holder can be opened momentarily to permit the insertion of a workpiece, after which releasing of the opening mechanism allows the closure of the torsion unit until the workholder is firmly gripped against rotation. The torque applied to the workpiece by the lathe or hone with which it is being worked effectively tightens the torsion unit so that the workpiece cannot slip within the workholder. In the embodiment 100 of my invention, different sizes of gripping assemblies can be selectively installed within the workholder. In the case of the embodiment 200 of my invention, one unit can readily replace another, simply by removing the bolts in the four mounting holes of the mounting flange and substituting another in its place.

Although there have been described hereinabove various specific arrangements of a work-holding apparatus in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. Work-holding apparatus comprising:
 a generally cylindrical housing having a mounting flange and a cylindrical bore;
 an assembly installed in said housing bore and including circumferential torsion band means for releasably gripping a workpiece placed within a central opening defined by said torsion band means; and
 actuating means coupled to said torsion band means for controlling the central opening thereof, said actuating means including:
   a rotatable cam disk having a plurality of cam slots therein;
   a plurality of cam following pins engaging said slots and movable radially inward and outward with rotation of the cam disk; and
   coupling means between the pins and the torsion band means for adjusting the size of the central opening in response to rotation of the cam disk.

2. The apparatus of claim 1 further including a lever arm extending outwardly from said cam disk for effecting rotation of the cam disk.

3. The apparatus of claim 2 further including means coupled to said lever arm for biasing the cam disk to a released position establishing a minimum size of said central opening.

4. The apparatus of claim 1 wherein said actuating means comprise a plurality of individual actuator plates and said torsion band means comprise a plurality of individual torsion bands, each being affixed at one end to a corresponding one of the actuator plates.

5. The apparatus of claim 4 wherein each of said actuator plates includes a pivot member at an end remote from the attached torsion band, said assembly further including means for pivotably mounting the actuator plates at equally spaced points about the interior surface of said bore.

6. The apparatus of claim 5 wherein said pivotably mounting means comprise a circumferential band having a plurality of regularly spaced actuator plate engaging elements.

7. The apparatus of claim 6 wherein each of said elements includes a hollow sleeve in which the pivot member of a corresponding actuator plate is pivotably mounted.

8. The apparatus of claim 5 wherein each of said actuator plates includes a cam following pin extending from a side edge of the plate into a corresponding slot of the cam disk.

9. The apparatus of claim 4 wherein each of said torsion bands includes a roughened portion adjacent an end of the band which is remote from the attached actuator plate and on the radially inner surface of the torsion band.

10. The apparatus of claim 9 wherein the plurality of torsion bands are curved and are mounted in a configuration wherein the roughened end portions of the bands overlap each other about said central opening.

11. The apparatus of claim 10 wherein the extent of overlap of the tension bands varies in accordance with the angular position of the cam disk and the size of the central opening.

12. The apparatus of claim 1 wherein said torsion band means comprise a single torsion band which is coiled in a plurality of turns and has an outer end shaped to define an anchor member and an inner end incorporating an actuator element for adjusting the size of the central opening in said torsion band.

13. The apparatus of claim 12 wherein said coupling means comprise a plurality of support segments positioned about the circumference of the single torsion band and radially outward therefrom for supporting said band, said cam following pins being mounted in corresponding support segments, and guide means between said support segments and said cam disk for guiding the support segments in radial movement with said cam following pins.

14. The apparatus of claim 13 wherein each of said support segments comprises a pie-shaped portion in which a cam following pin is mounted and an arcuate portion attached to the pie-shaped portion in a generally L-shaped configuration, said arcuate portions being positioned radially outward from the torsion band.

15. The apparatus of claim 13 wherein said guide means comprise a segment carrier disk positioned adjacent the cam disk and defining a plurality of radially directed, T-shaped recesses in a surface remote from the cam disk, each support segment having a mating T-shaped projection installed in sliding relationship in a corresponding T-shaped recess.

16. The apparatus of claim 15 wherein said segment carrier disk includes means defining a radial slot at the base of each of said T-shaped recesses, the cam following pins extending through said slots to engage the corresponding cam slots in the cam disk.

17. The apparatus of claim 14 wherein one of said support segments has its arcuate portion shaped to engage the anchor member of the torsion band, thereby anchoring the end of the torsion band to said shaped support segment.

18. The apparatus of claim 12 wherein said torsion band has a roughened surface adjacent the end having said actuator element and along the inner surface thereof.

19. The apparatus of claim 15 further including means for setting the angular position of said segment carrier disk relative to said housing.

20. The apparatus of claim 19 wherein said setting means comprise means defining a recess at a point in the periphery of the segment carrier disk and a set screw extending through a wall of said housing into said recess.

21. The apparatus of claim 2 wherein said lever arm extends outwardly through a circumferential slot in said housing and is selectively adjustable between the ends of said slot, one edge of said slot being serrated to provide a plurality of points for releasably retaining a selected position setting of the lever and associated cam disk.

22. The apparatus of claim 1 wherein said assembly comprises a grip assembly having a single torsion band which is coiled in a plurality of turns as said circumferential torsion band means, said single torsion band having an outer end shaped to define an anchor member and an inner end incorporating an actuator element for adjusting the size of the central opening in said torsion band, said apparatus further comprising a control assembly installed within said housing and coupled to said actuator element.

23. The apparatus of claim 22 wherein said control assembly comprises inner and outer concentric rings relatively rotatable with respect to each other and said housing, each of said rings having radially displaced shell portions defining an annular chamber, and a coiled tension spring positioned within said chamber and having opposite ends respectively anchored to said shell portions.

24. The apparatus of claim 23 wherein said outer ring includes a plurality of detent recesses regularly spaced about its periphery, said housing including a detent ball and biasing spring for releasably retaining a preselected angular position of said outer ring.

25. The apparatus of claim 24 including means for rotating said inner ring in order to adjust the diameter of said central opening.

26. The apparatus of claim 25 wherein said control assembly is coupled to said actuator element by an actuator link pivotably mounted to said inner ring.

27. The apparatus of claim 26 wherein said actuator link includes means defining an opening in the free end of said link for receiving said actuator element of said torsion band.

28. The apparatus of claim 25 wherein the means for rotating the inner ring comprise a handwheel portion projecting axially outward from said housing.

29. The apparatus of claim 25 wherein the means for rotating the inner ring comprise a cable attached to a peripheral point of said inner ring.

30. The apparatus of claim 39 wherein said cable is wound from said peripheral point in a plurality of turns about said projecting portion of said inner ring.

31. The apparatus of claim 30 further including means for moving said pulley away from said housing to take up said cable from said inner ring.

32. The apparatus of claim 31 further including means for controlling said cable to determine the angular position of said inner ring.

33. The apparatus of claim 32 wherein said cable controlling means comprise a pulley coupled to a piston within a cylinder which is mounted on said housing.

34. The apparatus of claim 33 further including means for transferring compressed air into and out of said cylinder to extend and retract said pulley.

35. The apparatus of claim 34 further including adjustable means for anchoring a free end of said cable to said housing.

36. The apparatus of claim 24 wherein said outer ring further includes a portion projecting axially from said housing and having a plurality of regularly spaced attachment points for a spanner about its periphery for permitting adjustment of the angular position of the outer ring by shifting between detent positions.

37. Work-holding apparatus comprising:
a generally cylindrical housing having a mounting flange and a cylindrical bore;
a control assembly and a grip assembly concentrically and coaxially positioned within said bore;
said grip assembly having circumferential torsion band means for releasably gripping a workpiece mounted in a central opening defined by said torsion band means; and
means coupling the control assembly to the grip assembly for enabling rotation of the control assembly to adjust the opening defined by said tension band means.

38. Work-holding apparatus comprising:
a generally cylindrical housing having a mounting flange and a cylindrical bore defining an interior wall;
a plurality of individual torsion band members pivotally suspended from the interior wall of said housing and extending inwardly to a circumferentially overlapped position defining a variable central opening and
means coupled in common to all of said tension band members to vary the angular orientation of said members in unison in order to variably control the size of said central opening.

39. The method of adjusting a work-holding apparatus having a variable size central opening for holding a generally cylindrical workpiece, comprising the steps of:
mounting said work-holding apparatus on a work machine in position to hold a workpiece;
controlling in unison the angular orientations of a plurality of individual tension band members which are pivotably mounted at regularly spaced pivot points about the interior of the work-holding apparatus to establish a centrally located zone of overlapped ends defining said central opening;
moving said tension band members in unison about their pivot points to vary the degree of overlap of their respective ends in order to increase the size of said opening sufficient to receive a workpiece therein; and
after a workpiece is placed in the increased size opening established by the last-mentioned step, moving said tension band members in unison to increase the extent of overlap and reduce the size of said central opening until the inner ends of said tension band members frictionally engage said workpiece.

* * * * *